(12) United States Patent
Quak et al.

(10) Patent No.: US 6,228,007 B1
(45) Date of Patent: May 8, 2001

(54) MACHINE TOOL FOR PROCESSING CRANKSHAFTS

(75) Inventors: Andreas Quak; Hans-Joachim Dey, both of Erkrath (DE)

(73) Assignee: Honsberg Lamb Sonderwerkzeugmaschinen GmbH, Remscheid (DE)

( * ) Notice: Subject to any disclaimer, the term of this patent is extended or adjusted under 35 U.S.C. 154(b) by 0 days.

(21) Appl. No.: 09/432,225

(22) Filed: Nov. 3, 1999

(30) Foreign Application Priority Data

May 5, 1999 (DE) ........................... 299 07 963 U

(51) Int. Cl.⁷ .................... B23Q 3/157; B23B 47/28
(52) U.S. Cl. .................... 483/56; 483/55; 483/31; 483/3; 409/165; 408/51
(58) Field of Search .................... 483/30, 37, 31, 483/16, 13, 14, 3, 55, 56; 29/6.01, 563, DIG. 56, 38 E; 408/51, 50, 71; 409/199, 200, 134, 165; 82/106

(56) References Cited

U.S. PATENT DOCUMENTS

| | | |
|---|---|---|
| 408,259 | 8/1889 | Pentz . |
| 1,752,961 | 1/1930 | Oliver . |
| 2,033,686 | 3/1936 | Davis . |
| 2,057,939 | 10/1936 | Davis . |
| 2,233,993 * | 3/1941 | Campbell ........................ 82/106 |
| 2,310,870 | 1/1943 | Retterath . |
| 2,408,491 | 10/1946 | Strickland . |
| 2,963,944 | 12/1960 | Straus . |
| 3,095,767 | 7/1963 | Jesonis . |
| 3,189,065 * | 6/1965 | Cochrane et al. ............... 408/51 |
| 3,203,314 | 8/1965 | Ried . |
| 3,232,141 | 2/1966 | Swanson et al. . |
| 3,382,740 | 5/1968 | Lotta . |
| 3,466,740 * | 9/1969 | Harman .......................... 483/37 |
| 3,577,828 | 5/1971 | Stickney . |
| 3,712,175 | 1/1973 | Muller et al. . |
| 3,782,847 | 1/1974 | Kulzer . |
| 3,806,691 * | 4/1974 | Roach ........................ 408/236 X |
| 3,822,959 | 7/1974 | Tabard . |
| 3,841,782 | 10/1974 | Mengeringhausen . |
| 3,841,783 | 10/1974 | Mengeringhausen . |

(List continued on next page.)

FOREIGN PATENT DOCUMENTS

| | | |
|---|---|---|
| 365598 | 11/1962 | (CH) . |
| 603134 | 6/1948 | (GB) . |
| 58-165950 * | 10/1983 | (JP) ............................... 483/3 |
| 8909675 | 10/1989 | (WO) . |

OTHER PUBLICATIONS

Publication of Veet Industries, May 1958, "New Features of Superlative Quality Distinguish The Low Cost Veet 3 Foot Radials".

Primary Examiner—A. L. Wellington
Assistant Examiner—Erica Ergenbright
(74) Attorney, Agent, or Firm—Diller, Ramik & Wight, PC

(57) ABSTRACT

The machine tool comprises a workpiece carrier (16) into which crankshafts (10, 10a) can be clamped one above the other in horizontal alignment. The workpiece carrier (16) is fixed to a turntable (15) on a horizontal slide (14) with the turntable being pivoted around a vertical axis (A). After the turntable (15) has been brought into an inclined position, the crankshafts (10, 10a) are provided with oblique drill holes by means of the drills (26, 26a). A tool magazine (32) comprises a first circulating magazine (33) for drilling tools and a second circulating magazine (34) for drill bushings (27, 27a). The tools are exchanged between tool magazine (32) and spindle box (24) by means of the pick-up process.

12 Claims, 5 Drawing Sheets

U.S. PATENT DOCUMENTS

| | | |
|---|---|---|
| 3,841,784 | 10/1974 | Mengeringhausen . |
| 3,850,540 | 11/1974 | Mengeringhausen . |
| 3,998,127 | 12/1976 | Romeu . |
| 4,187,601 | 2/1980 | Aldrin . |
| 4,369,958 | 1/1983 | Maynard . |
| 4,529,342 | 7/1985 | Babel . |
| 4,589,174 | 5/1986 | Allen . |
| 4,604,787 | 8/1986 | Silvers, Jr. . |
| 4,624,610 * | 11/1986 | Phillips et al. .................. 409/199 |
| 4,637,107 | 1/1987 | Romeu . |
| 4,655,652 | 4/1987 | Schissler . |
| 4,656,726 | 4/1987 | Suzuki et al. . |
| 4,664,570 | 5/1987 | Tsukiji et al. . |
| 4,988,244 | 1/1991 | Sheldon et al. . |
| 5,022,802 | 6/1991 | Yokoi . |
| 5,023,983 | 6/1991 | Winkler et al. . |
| 5,028,180 | 7/1991 | Sheldon et al. . |
| 5,058,261 | 10/1991 | Kitamura . |
| 5,172,464 | 12/1992 | Kitamura et al. . |
| 5,391,850 | 2/1995 | Mueller . |
| 5,482,414 * | 1/1996 | Hayashi et al. .................. 409/134 |
| 5,624,215 | 4/1997 | Boucher et al. . |
| 5,688,084 * | 11/1997 | Fritz et al. ..................... 409/202 |
| 5,699,599 | 12/1997 | Zieve . |
| 5,759,140 | 6/1998 | Egbert . |
| 6,077,206 * | 6/2000 | Azema ............................. 483/3 |
| 6,082,939 * | 7/2000 | Nakashima et al. ............. 409/134 |

* cited by examiner

MACHINE TOOL FOR PROCESSING CRANKSHAFTS

BACKGROUND OF THE INVENTION

The invention relates to a machine tool for processing crankshafts and in particular drilling oil holes as oblique drill holes in crankshafts.

Crankshafts display a plurality of main bearings along their main axes and lifting bearings at the cranks. To lubricate the lifting bearings, oblique drill holes are produced which extend from one lifting bearing through the offest to the main bearing. Such drill holes are relatively long and the production of these holes requires very accurate oblique alignment of the crankshaft.

A machine tool for producing drill holes in crankshafts is disclosed in U.S. Pat. No. 5,759,140. This machine tool comprises a workpiece carrier with two clamping devices which allow two crankshafts to be processed synchronously. The workpiece carrier can be pivoted around a horizontal transverse axis and it can assume such an inclined position that the horizontally aligned and horizontally guided tools hit upon the crankshafts at the desired drilling angle. To produce a plurality of drill holes at different locations along the crankshaft, the spindle box is controllably displaced in vertical direction. Drill bushings are associated to the tools (drills) inserted in the spindles. The tools and drill bushings are taken from a tool magazine and can be automatically exchanged.

SUMMARY OF THE INVENTION

The object of the invention is to create an improved machine tool for processing crankshafts with horizontally aligned spindle, which is simplified in spatial and kinematic aspects.

In the machine tool of the invention the workpiece carrier is rotated around a vertical axis to produce the oblique drill hole. Thus the crankshaft is always kept in horizontal alignment and is not pivoted around a vertical axis. The required oblique angle is adjusted on a horizontal plane. Hence the crankshaft is fixed with the crankshaft plane being aligned horizontally whereas the inclined position is obtained by rotating the turntable. This reduces the space required in particular for processing and exchanging the crankshaft. The turntable which can be rotated around a vertical axis always retains the crankshaft in horizontal alignment so that it is possible to advance and insert the crankshaft with horizontally extending longitudinal axis.

According to a preferred development of the invention the turntable is supported by a horizontal slide which can be controllably moved in horizontal direction. Said horizontal slide allows incremental movement of the crankshaft from one drilling location to the next. This advance movement is effected by displacement of the workpiece (crankshaft) while the position of the spindle box transversely to the axial alignment of the spindle remains unchanged. The movement of the horizontal slide, which comprises the workpiece carrier, is easier, more accurate and rapid to control due to the lower mass involved so that a corresponding movement of the spindle box in transverse direction is not required.

Preferably the spindle box arrranged at a vertical slide is vertically movable along a fixed post between a working position and a lifting position. At the level of the lifting position a tool magazine for direct transfer of tools to and from the spindle is arranged. During the processing the spindle box always remains at the level of the working position. The spindle box can be vertically adjusted since the drill holes to be produced are normally not located in the bearing centre. Further, the vertical adjustment allows the spindle box to be moved into a lifting position in which it cooperates with a tool magazine. This tool magazine is located above the processing plane so that the tools in the tool magazine can be easily exchanged during operation.

According to a preferred development of the invention it is envisaged that the spindle box comprises for each spindle a drill bushing holder which contains an exchangeable drill bushing and can be moved in longitudinal direction independently of the associated spindle. The drill bushings guide the drill and are placed against the workpiece. The drill bushing holders comprise their own actuators by means of which they are moved out of the vertical slide up to the respective location of the workpiece. While the workpiece, together with the spindle box, is moved in axial direction of the spindle, the drill bushing holder projects from the vertical slide carrying the spindle box. This ensures that the drill bushing remains in its position during the advance movement of the drill. Longitudinal adjustment of the drill bushing is necessary to adjust the drill bushing to the respective distance of the crankshaft arranged in inclined position on the horizontal plane.

The tool magazine comprises a first circulating magazine for tools and a second circulating magazine for drill bushings. Preferably the two circulating magazines are controllably actuated independently of each other in such a way that different tools can be aligned with the same drill bushing. Normally the tools are subjected to heavier wear than the drill bushings. It is thus possible to use one and the same drill bushing for a plurality of tools. The independent control of the two circulating magazines allows tools and drill bushings to be combined in any way desired.

Preferably the workpiece carrier comprises two clamping devices arranged one above the other so that two crankshafts arranged side by side and one above the other can be simultaneously processed.

BRIEF DESCRIPTION OF THE DRAWINGS

Hereunder a preferred embodiment of the invention is explained in detail with reference to the drawings in which.

DESCRIPTION OF THE PREFERRED EMBODIMENT

Figure 1:
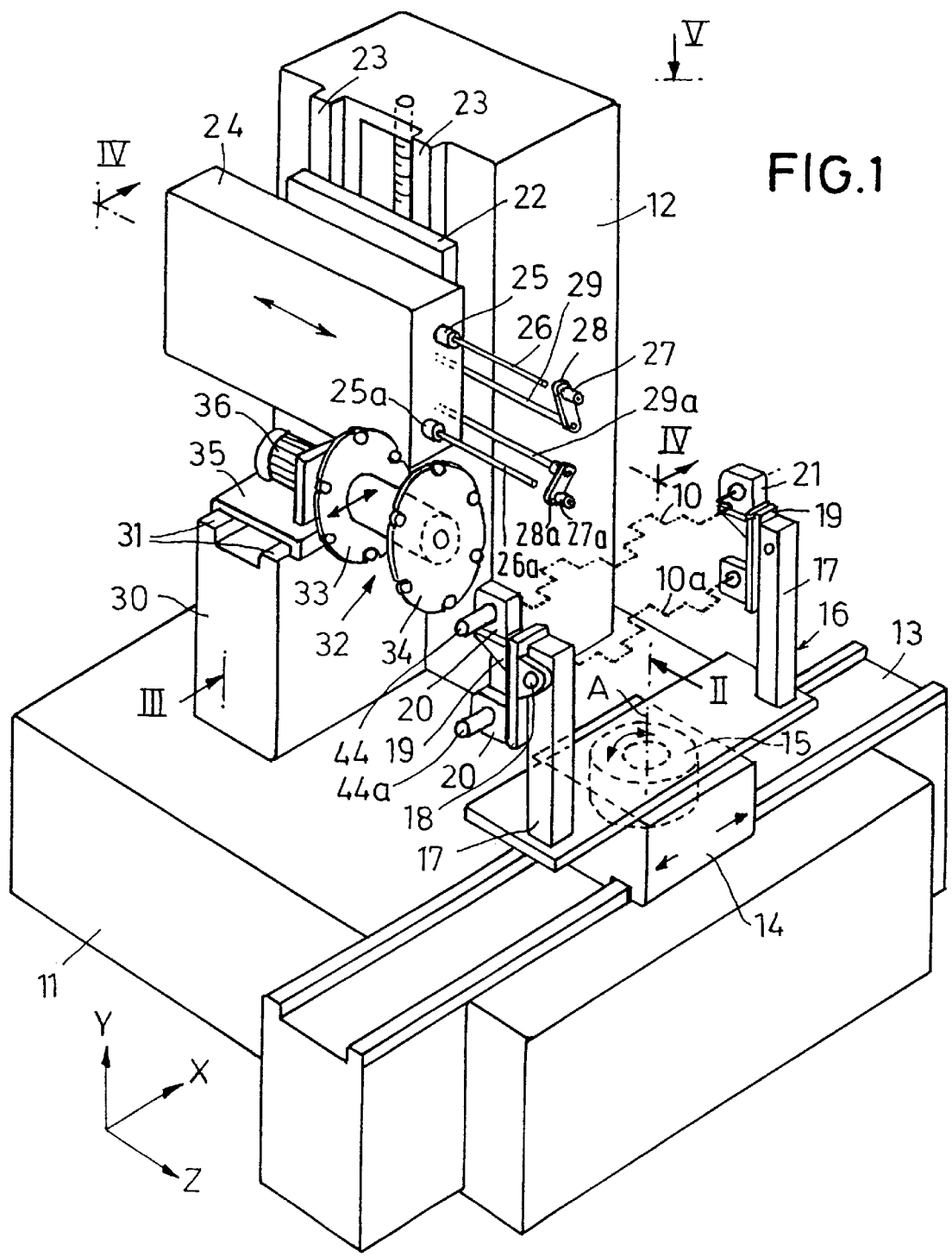
FIG. 1 shows a schematic perspective general view of the machine tool.
Figure 5:
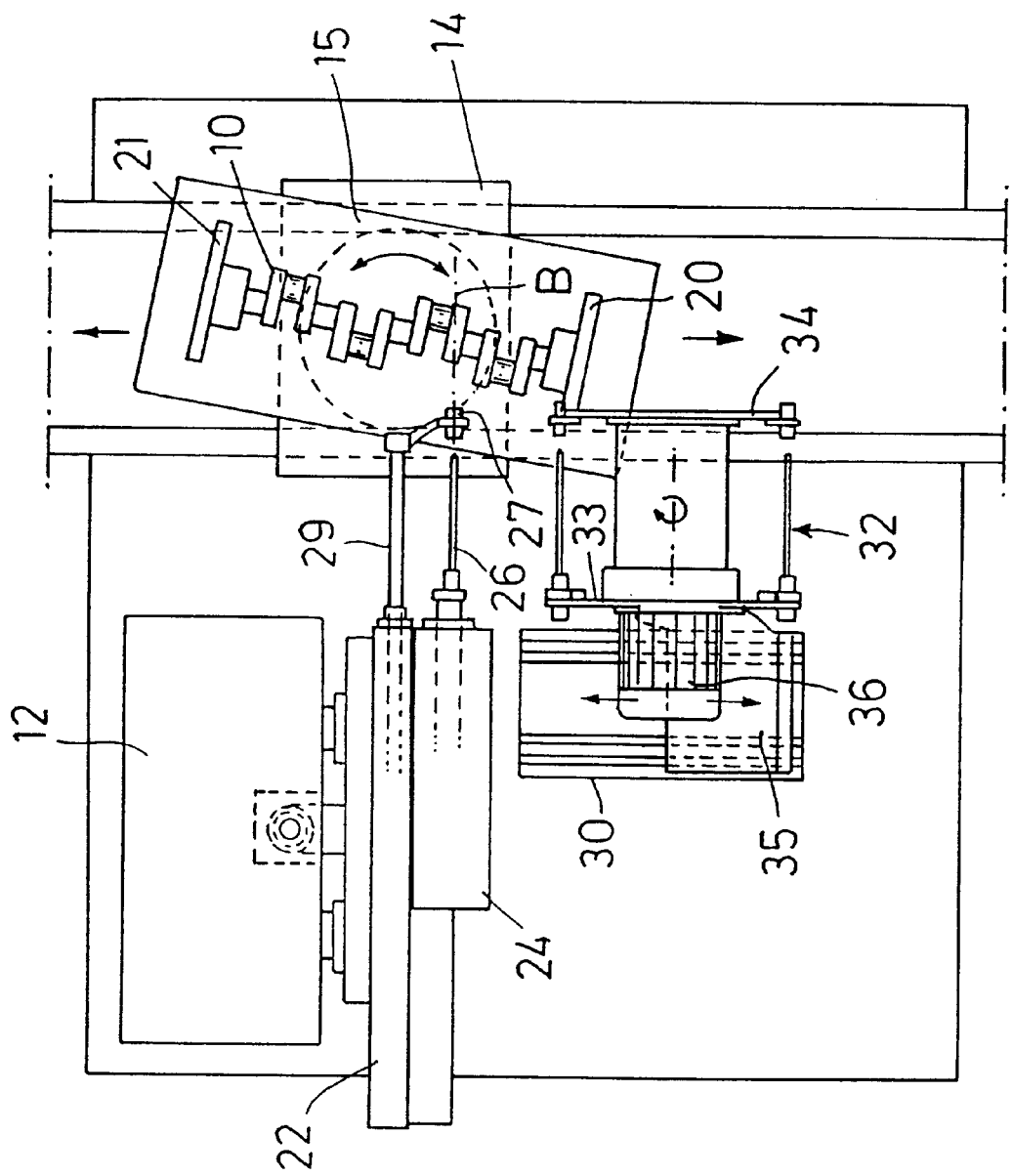
FIG. 5 shows a top view as seen in the direction of arrow V of FIG. 1.

The machine tool serves for processing crankshafts, in this particular case for simultaneous processing of two crankshafts 10, 10a which are only schematically represented in FIG. 1. FIG. 5 shows the crankshaft 10 in greater detail.

The machine tool comprises a machine bed 11 carrying a post 12. The machine bed 11 is provided with a horizontal guide 13 on which a horizontal slide 14 can be controllably moved. The horizontal slide 14 supports a workpiece carrier 16 on a turntable 15. The workpiece carrier 16 comprises two posts 17 projecting from the turntable 15 with each post carrying a holder 19 pivoting around a horizontal axis 18 and provided with two clamping devices 20, 21 for accommodation of a crankshaft. The clamping device 20 at the one end is a chuck engaging in a flange of the crankshaft whereas the other clamping device 21 is configured as tailstock. The clamping devices 20, 21 retain the respective crankshaft 10 and 10a respectively in position. However, the clamping devices are also provided with a rotary actuator (not shown) which allows the clamped crankshaft to be separately rotated for the drilling positions.

On the post 12 a height-adjustable vertical slide 12 can be controllably moved along a vertical guide 23. The vertical slide 22 carries a spindle box 24 which can be horizontally moved along the vertical slide. The spindle box 24 contains two spindles 25, 25a which are located one above the other on a vertical plane. A tool 26, 26a is clamped in the tool reception device of each spindle 25, 25a. These tools are elongate drills for production of oblique drill holes in the crankshafts.

A drill bushing 27, 27a is associated to each tool 26, 26a. The drill bushings are exchangeably fixed to a drill bushing holder 28, 28a which is carried by a drill bushing rod 29, 29a. The drill bushing rods 29 and 29a project from the vertical slide 22 and can be controllably displaced in longitudinal direction by means of an actuator (not shown) arranged at the vertical slide 22. In the vertical slide 22 or the spindle box 24 the drill bushing rod is supported in such a way that it can be axially displaced and it can be positioned by an independent adjusting device (in this case a hydraulic cylinder) in a plurality of axial positions relative to the tool. These positions are required to a) move the drill bushing over the drill (after tool exchange), b) pull out the drill bushing in forward direction over the drill (prior to tool exchange), c) allow use of another tool (for deburring) which does not require any drill bushing.

Prior to a drilling process the spindle box 24 is moved so close to the workpiece in accordance with a) that it contacts the workpiece at a given contact pressure. The drill bushing remains in contact with the workpiece during the subsequent drilling process due to a controlled movement of the drill bushing rod/holder in the spindle box relative to the NC-controlled drill advance. This keeps the pressure in the hydraulic cylinder constant which allows the drill and the drill bushing to move relatively to each other.

FIG. 1 shows the X, Y, Z-coordinate system of the machine tool. The X-axis runs parallel to the horizontal guide 13, the Y-axis is the vertical axis along which the vertical slide 22 is moved and the Z-axis shows the alignment of the spindles 25, 25a.

The machine bed 11 carries a base 30 on which the tool magazine 32 can be moved along a guide 31 extending in X-direction. The tool magazine 32 comprises two circulating magazines 33 and 34 configured as disks. The circulating magazine 33 carries tools at the positions distributed over the circumference whereas the circulating magazine 34 contains drill bushings. A magazine location of the circulating magazine 34 is associated to every magazine location of the circulating magazine 33, but the two circulating magazines can be rotated relatively to each other so that this association may vary. The tool magazine 32 comprises a horizontal slide 35 carrying an actuator 36 for the circulating magazines 33 and 34. The horizontal slide 35 can be moved between a waiting position and an exchanging position. In the exchanging position two tools of the circulating magazine 33 and two drill bushings of the circulating magazine 34 are axially aligned with the spindles 25, 25a or with the drill bushing holders 28, 28a. The magazine locations of the two circulating magazines are open to the side. The tools and drill bushings contained in the circulating magazines are retained in a clamped position. Transfer to the spindles 25, 25a and drill bushing holders 28, 28a is effected by the pick-up process, i.e. the corresponding magazine location is moved into an exchanging position in front of the spindle box 24 in axial alignment with the respective spindle 25 or 25a. The spindle takes up the tool in the exchanging position by means of advancing and clamping processes and the drill bushing holder takes up the drill bushing in the exchanging position. When the spindle has clamped the tool and the drill bushing holder has clamped the drill bushing, the tool magazine 32 returns into the waiting position, i.e. the tool magazine itself "takes up" the tools and "releases" them from its collet. The tools are thus exchanged without the use of any separate tool exchanging or transfer devices.

Figure 3:
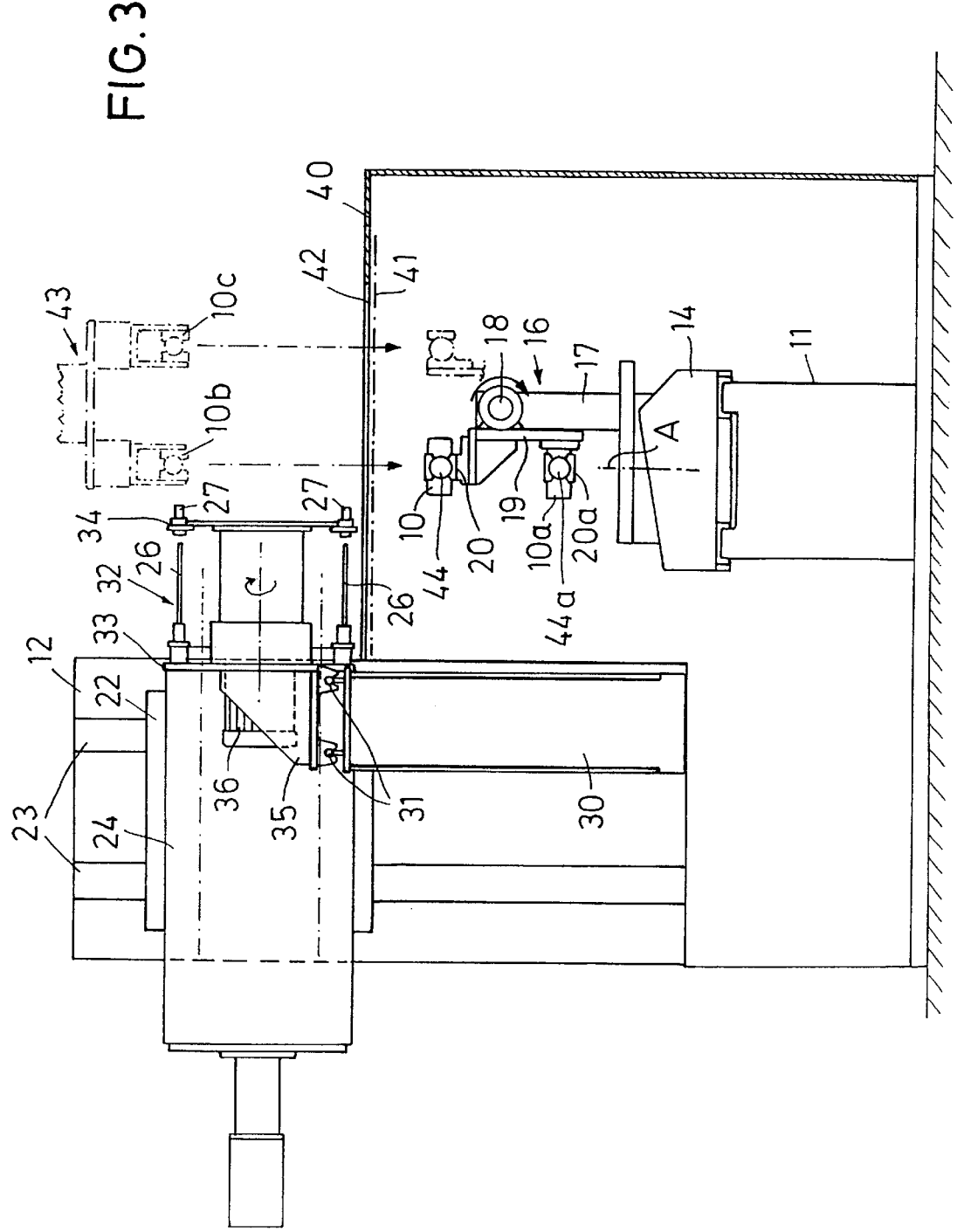
FIG. 3 shows a side view as seen in the direction of arrow III of FIG. 1.

The side view of FIG. 3 shows that the horizontal slide 14 with the workpiece carrier 16 is accommodated in a box-shaped housing 40 which comprises an opening 42 in the upper wall, which can be closed with a movable cover 41. Through the opening 42 the charging device 43 can be lowered with the charging device containing two crankshafts 10b and 10c to be processed which are horizontally positioned one beside the other. To receive the new crankshafts the holder 19 is pivoted around the horizontal axis 18 so that the clamping devices 20, 20a for the two crankshafts, which are normally vertially positioned one above the other, are now horizontally positioned side by side. By lowering the transfer device 43 the crankshafts 10b, 10c are transferred to the clamping devices 20, 20a. Then the holder 19 returns into the vertical position.

FIG. 3 also shows that the tool magazine 32 is arranged outside the housing 40. To exchange the tools the spindle box 24 is moved upwards through the opening 42 and beyond the upper wall up to the level of the tool magazine 32 so that the tool magazine 32 can be laterally moved to the spindles 25, 25a or the drill bushing holders 28, 28a.

Figure 4:
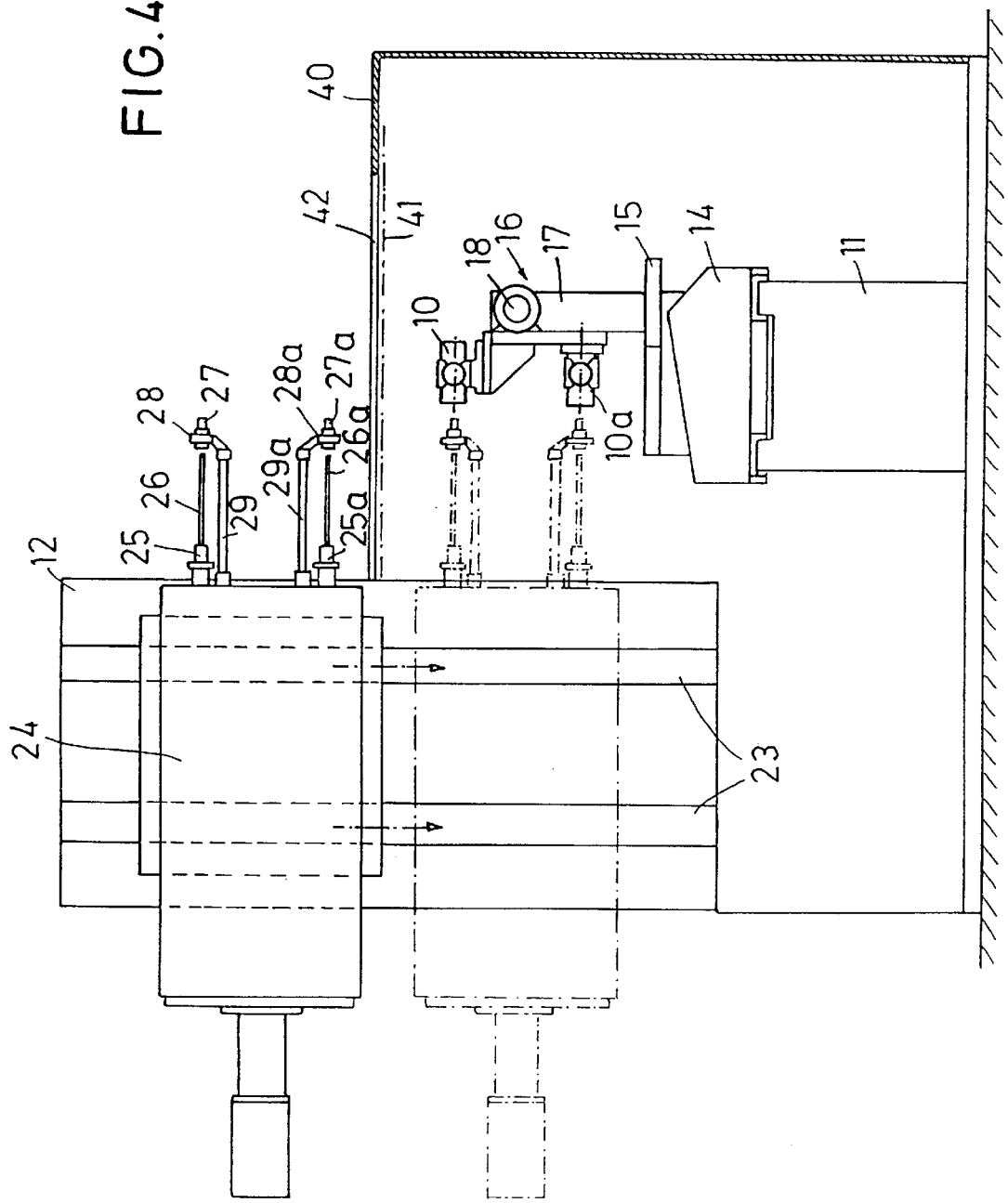
FIG. 4 shows a section of plane IV—IV of FIG. 1.

FIG. 4 shows the spindle box 24 in lifted condition, i.e. during tool exchange at the level of the tool magazine 32. Then the spindle box 24 is lowered into the position represented by the dash-dotted line and subsequently the opening 42 is closed with cover 41. Appropriately a second opening is provided which, independent of the opening 41, allows the spindle box to be moved into the tool exchanging position. This second opening is provided with its own second cover. The workpiece is processed in the closed housing 40 in order to prevent contamination of the neighbourhood by drilling fluid. When processing of the workpiece has been terminated, the workpiece carrier is pivoted around axis 18 so that the workpieces can be taken out of the transfer device and lifted side by side through the opening 42.

Figure 2:
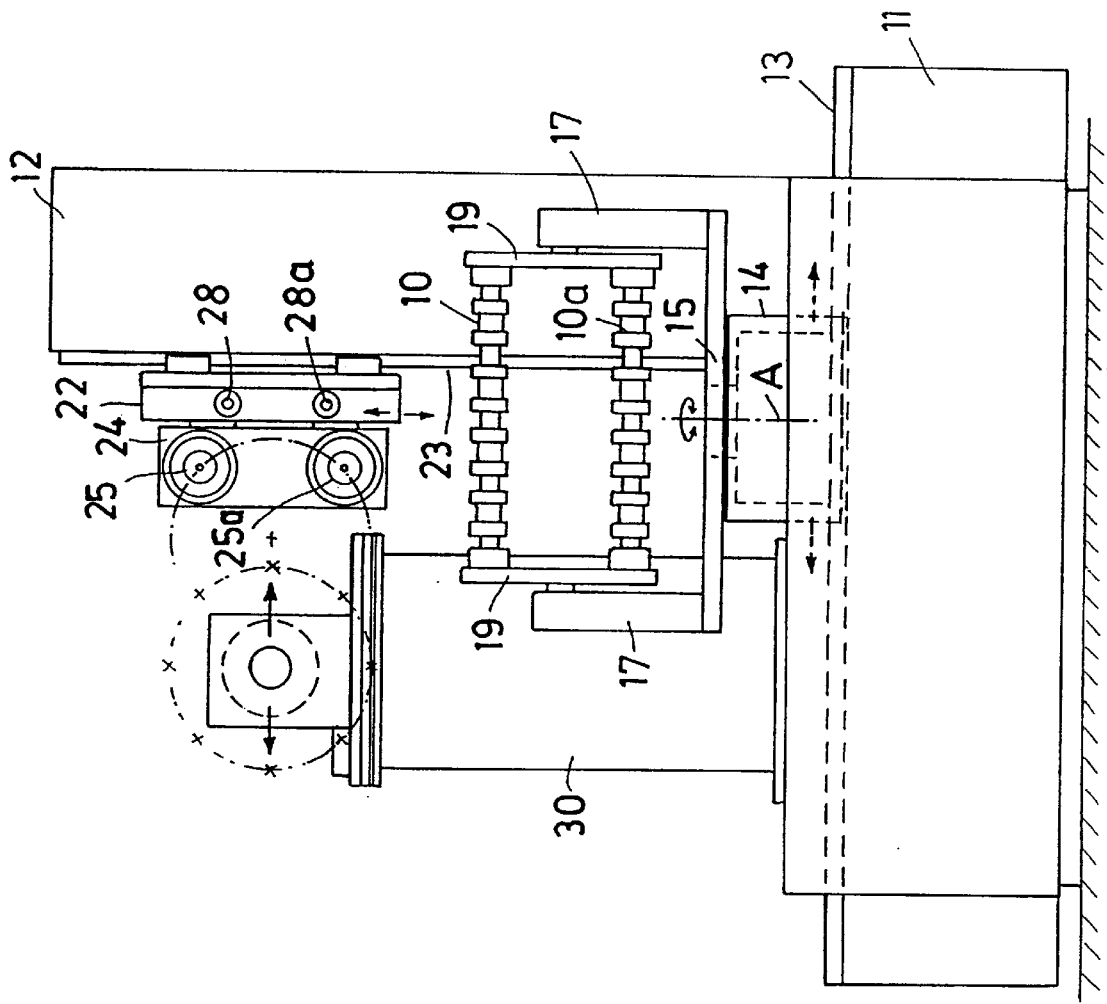
FIG. 2 shows a front view as seen in the direction of arrow II of FIG. 1.

FIG. 5 shows a top view of the machine tool with a workpiece being processed. The turntable 15 to which the crankshafts are clamped is rotated by a small rotation angle around the vertical axis A (FIGS. 1, 2 and 5) so that the longitudinal axis B (FIG. 5) of the drilling tool 26 extends transversely through a crankarm of the crankshaft 10. After drilling along the axis B the horizontal slide 14 is controllably moved along the X-axis and, if required, the crankshaft is rotated around its longitudinal axis by means of a controlled rotary actuator 44 or 44a and thus its angle is repositioned so that another oblique drill hole can be produced. Prior to drilling the drill bushing 27 is placed against the crankshaft 10 and during drilling the spindle box 24 is advanced in Z-direction.

After termination of all drilling processes the turntable 15 returns into is neutral position and the holder 19 is lifted from the vertical processing position into the horizontal workpiece exchanging position. Then the processed crankshafts 10, 10a are removed through the opening 42.

What is claimed is:

1. A machine tool for machining holes in crankshafts comprising:

a base;

a spindle box carried by the base and having at least two spindles each rotatable about a separate first axis and constructed and arranged to drive a separate tool, and the spindles being constructed and arranged so that the first axes are parallel to and spaced apart from each other;

a turntable rotatable about a second vertical axis disposed at substantially a right angle to each first axis;

a workpiece carrier carried by the turntable for rotation therewith and having a holder with at least two clamping devices each for holding a separate crankshaft with a third longitudinal axis of rotation at substantially a right angle to the second axis for rotation of the crankshaft by the turntable about the second axis to dispose the third axis of each clamped crankshaft at an oblique angle to the first axis of a corresponding spindle for machining with the tool driven by the spindle an oblique hole in the crankshaft;

the holder being carried by the workpiece carrier and constructed and arranged to be movable about a fourth axis substantially parallel to each third axis and at substantially a right angle to the second axis between a machining position in which the crankshafts are substantially vertically spaced apart and facing the spindles and a crankshaft changing position in which the crankshafts are spaced from the machining position and do not face the spindles; and a first slide carried by the base and constructed and arranged to move relatively the turntable and the spindle box along a fifth axis substantially perpendicular to each of the first and second axes;

whereby holes at a plurality of generally axially spaced apart locations may be machined each at an oblique angle to the third axis of each of the crankshafts by tools carried by the spindles.

2. The machine tool defined by claim 1 wherein the clamping device for each crankshaft also comprises an actuator carried by the holder and constructed to rotate a crankshaft clamped therein about its third axis to in part position the crankshaft for the machining of a hole therein.

3. The machine tool defined by claim 1 which also comprises a second slide carried by the base and movable along a sixth axis substantially parallel to and spaced from the second axis and at substantially a right angle to the first axes, the spindle box being carried by the second slide for movement by the second slide between a machining position and a tool change position remote from the machining position, and a tool changer for transfer of a tool to and from at least one of the spindles when the spindle box is in the tool change position.

4. The machine tool defined by claim 3 wherein the tool changer comprises at least one circulating magazine.

5. The machine tool defined by claim 3 wherein the tool changer comprises at least two circulating magazines actuated separately and independently of each other with one of the magazines constructed and arranged to carry a plurality of different tools and the other magazine constructed and arranged to carry a plurality of different drill bushings.

6. The machine tool defined by claim 5 which also comprises a drill bushing rod associated with each spindle and carried by one of the spindle box and the second slide and constructed and arranged to carry an exchangeable drill bushing, and an actuator connected to the drill bushing rod for moving the drill bushing independently of its associated spindle along the first axis of its associated spindle.

7. The machine tool defined by claim 3 which also comprises a housing enclosing the crankshafts carried by the workpiece carrier and the tools carried by the spindles when the spindle box is in the machining position and the housing has an opening through which the tools can pass when the second slide moves the spindle box from the machining position to the tool change position.

8. The machine tool defined by claim 3 which also comprises a drill bushing rod associated with each spindle and carried by one of the spindle box and the second slide and constructed and arranged to carry an exchangeable drill bushing, and an actuator connected to the drill bushing rod for moving the drill bushing independently of its associated spindle along the first axis of its associated spindle.

9. The machine tool defined by claim 3 wherein the turntable is carried by the first slide.

10. The machine tool defined by claim 3 wherein the first, third, fourth and fifth axes each extend substantially horizontally.

11. The machine tool defined by claim 1 which also comprises a housing enclosing the crankshafts carried by the workpiece holder and the tools carried by the spindles when the spindle box is in the machining position and the housing has an opening through which the crankshafts can pass when the holder is in the crankshaft changing position.

12. The machine tool defined by claim 1 wherein the turntable is carried by the first slide.

* * * * *